(12) United States Patent
Nohechi

(10) Patent No.: US 8,581,124 B2
(45) Date of Patent: Nov. 12, 2013

(54) TERMINAL DEVICE

(75) Inventor: Hideki Nohechi, Saitama (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 799 days.

(21) Appl. No.: 12/784,695

(22) Filed: May 21, 2010

(65) Prior Publication Data

US 2010/0302167 A1    Dec. 2, 2010

(30) Foreign Application Priority Data

May 28, 2009  (JP) ................................ P2009-129604

(51) Int. Cl.
*H01H 9/26* (2006.01)
*H01H 13/72* (2006.01)
*H01H 13/76* (2006.01)

(52) U.S. Cl.
USPC ........................................................ 200/5 A

(58) Field of Classification Search
USPC ......... 200/293, 294, 318, 333, 339, 341, 343, 200/345, 344, 512, 517, 5 R, 5 A, 5 B, 16 D, 200/46, 511, 520, 534, 244, 296, 314
See application file for complete search history.

(56) References Cited

U.S. PATENT DOCUMENTS

| | | | | |
|---|---|---|---|---|
| 6,148,183 | A * | 11/2000 | Higdon et al. | 455/575.1 |
| 7,217,892 | B2 * | 5/2007 | Hecht | 200/1 R |
| 2006/0021859 | A1 | 2/2006 | Chew | |
| 2010/0177033 | A1 * | 7/2010 | Chase | 345/156 |

FOREIGN PATENT DOCUMENTS

| | | |
|---|---|---|
| CN | 1901563 | 1/2007 |
| CN | 1933646 | 3/2007 |
| JP | 2009 60426 | 3/2009 |

OTHER PUBLICATIONS

Office Action issued in corresponding Chinese application No. 201010184260.0 dated May 15, 2013 and the English translation.

* cited by examiner

*Primary Examiner* — Edwin A. Leon
*Assistant Examiner* — Anthony R. Jimenez
(74) *Attorney, Agent, or Firm* — Frommer Lawrence & Haug LLP; William S. Frommer; Ellen Marcie Emas

(57) ABSTRACT

A terminal device includes a first housing, a key attached to a cut portion in a corner of the first housing, a key support portion configured to support the key, the key support portion including a shaft portion having a rotation axis on a side of a side face of the corner and attached to a bearing portion provided in the first housing and a peripheral edge portion caught by a peripheral edge of the cut portion, a transmitting portion configured to transmit a predetermined pressing force to a switch provided on the substrate via the key support portion when the predetermined pressing force is applied to the key in a rotation direction determined by the rotation axis, and a second housing combined with the first housing to which the key and the key support portion are attached so as to store the transmitting portion, the substrate, and the switch.

4 Claims, 9 Drawing Sheets

TERMINAL DEVICE

BACKGROUND OF THE INVENTION

1. Field of the Invention

The present invention relates to a terminal device that is suitably applied to, for example, key layout in a small mobile telephone.

2. Description of the Related Art

Portable terminal devices, such as mobile telephones, personal digital assistants (PDA), portable game machines, and notebook personal computers, have heretofore been used. In these terminal devices, a housing itself is small, and therefore, it is important how to design the key layout.

Japanese Unexamined Patent Application Publication No. 2009-60426 discloses a so-called straight type (stick type) small and thin mobile telephone having a total length of about 100 mm, a width of about 50 mm, and a thickness of about 10 mm.

SUMMARY OF THE INVENTION

In the mobile telephone disclosed in the above publication, a display unit occupies more than half of a surface of the housing, and therefore, the sizes of keys are reduced. In general, a key instructs an internal mechanism on an operation of the user by being pressed, and a fixed moving distance is ensured to press the key. Further, to prevent the key from falling off the housing, the key is located within the plane of the housing. For this reason, it is difficult to increase the number of keys. Moreover, since the keys are arranged only in the plane of the housing, the key layout and design of the mobile telephone are limited.

Accordingly, it is desirable to locate a key at the corner of a case.

A terminal device according to an embodiment of the present invention includes a first housing; a key attached to a cut portion of the corner of the first housing; a key support portion configured to support the key, the key support portion including a shaft portion having a rotation axis on a side of a side face of the corner and attached to a bearing portion provided in the first housing, and a peripheral edge portion caught by a peripheral edge of the cut portion provided in the first housing; a switch provided in a substrate; a transmitting portion configured to transmit a predetermined pressing force to the switch via the key support portion when the predetermined pressing force is applied to the key in a rotation direction determined by the rotation axis; and a second housing combined with the first housing to which the key and the key support portion are attached so as to store the transmitting portion, the substrate, and the switch.

Since the terminal device has the above-described configuration, the key can be attached to the cut portion provided at the corner of the first housing.

In the terminal device according to the embodiment of the present invention, after the key is connected to the key support portion, the key support portion is attached to the first housing, and the first housing is combined with the second housing together with the transmitting portion. In this case, the first housing has the bearing portion, and the shaft portion of the key support portion is attached to the bearing portion. This allows the key to be attached to the cut portion at the corner of the first housing while ensuring the predetermined moving distance of the key. For this reason, the key can be reliably attached to the corner even when the space where the key is attached is small in the first housing. Further, the key can turn on the rotation axis by the predetermined angle, and is connected by the connecting portion. Hence, the key does not easily fall off, the impact resistance of the key is increased, and the design of the key layout is improved.

DESCRIPTION OF THE PREFERRED EMBODIMENTS

The best mode for carrying out the present invention (hereinafter referred to as an embodiment) will be described below. The description will be given in the following order:

(1) An embodiment (exemplary configuration of portable terminal device)
(2) Modifications

1. Embodiment

Example of Portable Terminal Device

An embodiment of the present invention will be described below with reference to the attached drawings. The embodiment of the present invention is applied to a portable terminal device 1 that is easy to carry.

Figure 1A:
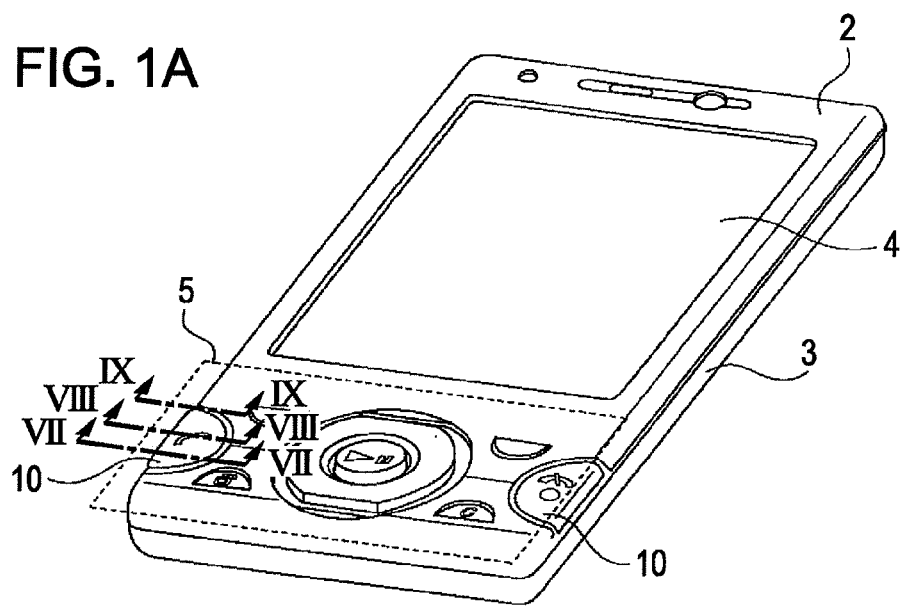
FIGS. 1A and 1B are perspective views illustrating an exemplary configuration of a portable terminal device according to an embodiment of the present invention.

FIG. 1A is a perspective view illustrating an exemplary external configuration of the portable terminal device 1 of the embodiment.

The portable terminal device 1 is formed as one housing defined by combining a first housing 2 provided on an upper side to be operated by the user and a second housing 3 provided on a lower side. The first housing 2 includes an operation unit 5 by which the user performs various operations. The operation unit 5 includes keys 10 attached to cut portions at the corners of the first housing 2, and the keys 10 are formed of synthetic resin such as AAS (acrylonitrile acrylate styrene).

The first housing 2 also includes an opening corresponding to a display surface of a display unit 4, such as a liquid crystal display, and the display surface is exposed from the opening. The second housing 3 stores the display unit 4, a substrate 6 (see FIG. 1B), and a battery, an antenna, and a communication interface that are not shown.

Figure 1B:
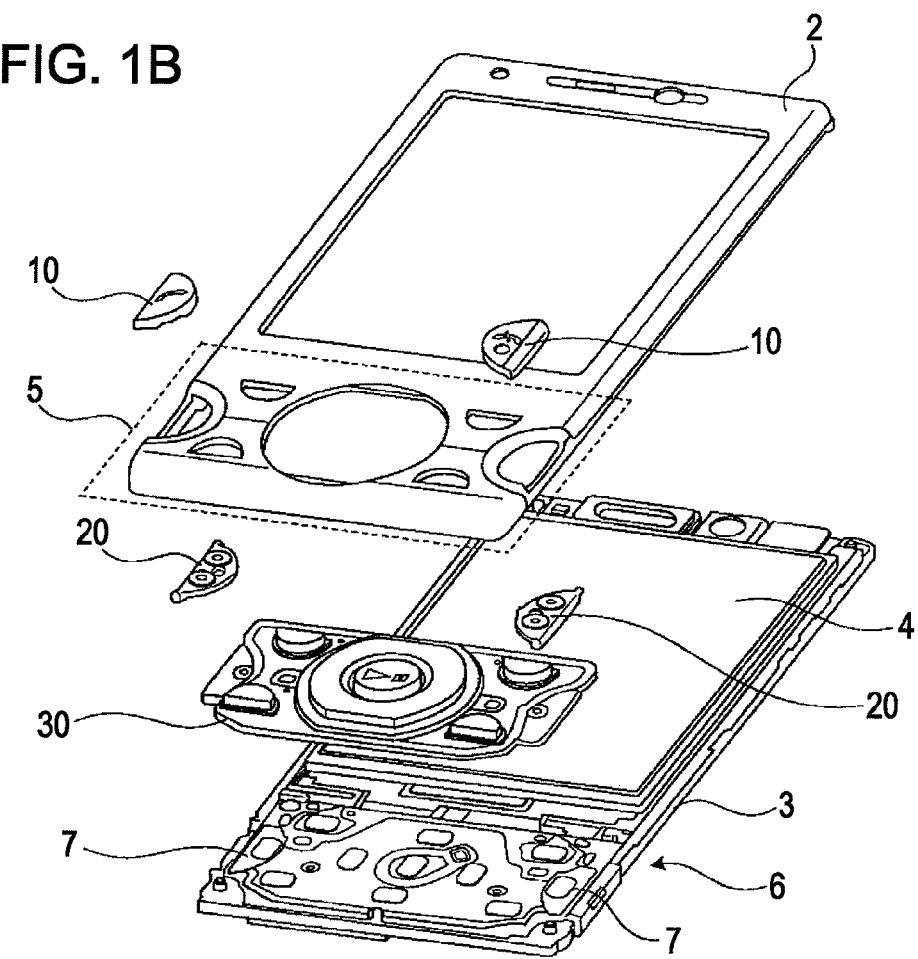

FIG. 1B is an exploded perspective view of the portable terminal device 1 of the embodiment.

In a state in which the first housing 2 and the second housing 3 are separated, various components are provided in an area corresponding to the operation unit 5. The portable terminal device 1 includes key support portions 20 that turn the keys 10 in a predetermined direction when the keys 10 are pressed by the user. The key support portions 20 support the keys 10 from a back side of the first housing 2 with connecting portions 12 (see FIG. 3) being disposed therebetween so that the keys 10 will not be detached from the first housing 2.

The first housing 2 includes a transmitting portion 30 that transmits pressing force applied to the keys 10 to various switches on the substrate 6 by projections shaped in conformity to the shapes of the back sides of the operation unit 5 and the key support portions 20. The transmitting portion 30 is formed of elastic resin, and prevents water entering from gaps between the first housing 2, the second housing 3, and the keys 10 from flowing onto the substrate 6. This makes the portable terminal device 1 waterproof.

The substrate 6 has switches 7 to be pressed for on/off switching. At pressing points on a back side of the transmitting portion 30, projections are provided in conformity to the shapes of various keys provided in the operation unit 5. The second housing 3 is combined with the first housing 2 to which the keys 10 and the key support portions 20 are attached, so that the transmitting portion 30, the substrate 6, and the switches 7 are stored therebetween.

Figure 2A:
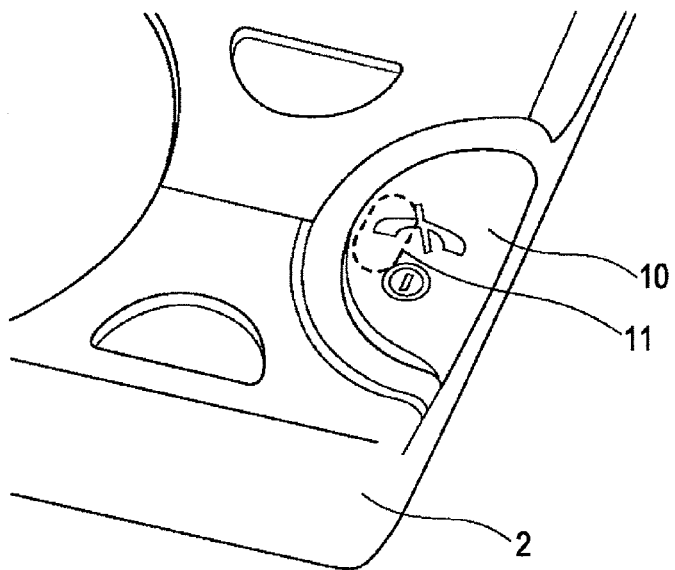
FIGS. 2A, 2B, and 2C are perspective views illustrating an exemplary structure of an operation unit of the embodiment.
Figure 2B:
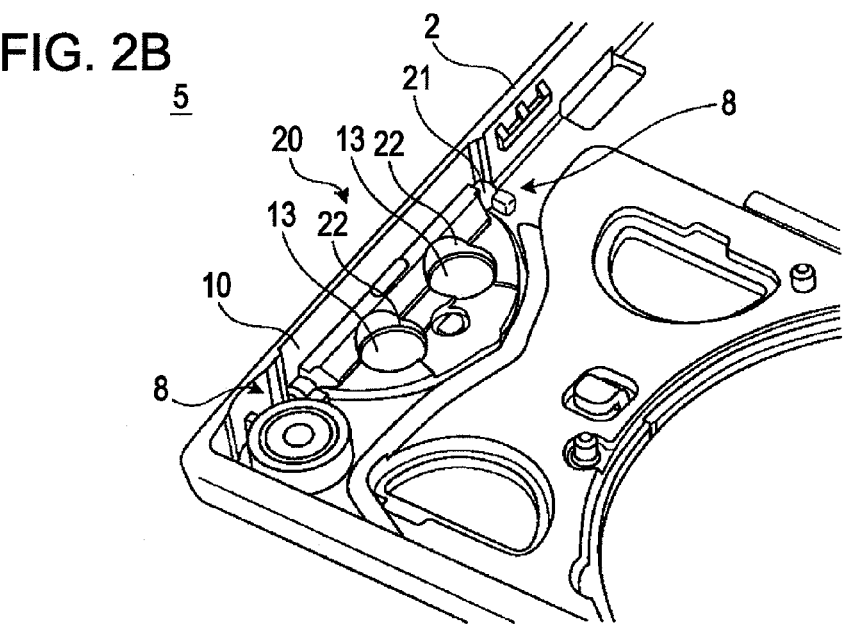
Figure 2C:
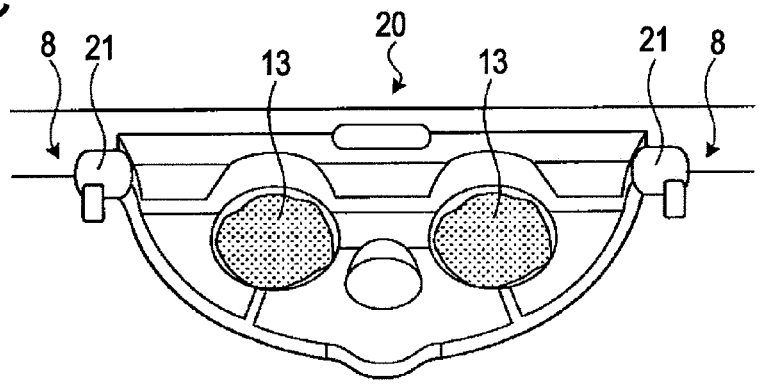

FIGS. 2A to 2C are perspective views illustrating an exemplary structure of the operation unit 5.

FIG. 2A is a perspective view illustrating an exemplary structure of the operation unit 5 when a part of the first housing 2 is viewed from the front side.

A key 10 included in the operation unit 5 is attached to a cut portion provided at the corner of a side face of the first housing 2. When the user presses a pressing area 11 shown by a broken line with a predetermined pressing force, the key 10 is tilted inward, and the pressing force is transmitted via the transmitting portion 30 to a switch 7 provided at a position corresponding to the pressing area 11.

FIG. 2B is a perspective view illustrating an exemplary structure of the operation unit 5 when the part of the first housing 2 is viewed from the back side.

A key support portion 20 for attaching the key 10 to the first housing 2 is provided on a back side of the key 10. The key support portion 20 includes through holes 22 and shaft portions 21 to be turned on a rotation axis on a side of the side face of the corner of the first housing 2. The shaft portions 21 are attached to bearing portions 8 provided in the first housing 2 in a manner such that the key 10 can be moved in a rotating direction determined by the rotation axis of the shaft portions 21. The key 10 also has connecting portions 12 that that are attached to the key support portion 20 so as to fix the key 10 to the key support portion 20, and the connecting portions 12 are inserted in the through holes 22 of the key support portion 20. The connecting portions 12 are transformed into welded portions 13 by welding.

FIG. 2C is an enlarged view illustrating an exemplary structure of the key support portion 20 when the part of the first housing 2 is viewed from the back side.

By welding the connecting portions 12 (two projections) inserted in the through holes 22, the key 10 is fixed to the key support portion 20. The outer diameter of the welded portions 13 is larger than the inner diameter of the through holes 22, so that the through holes 22 are filled with melted resin of the connecting portions 12.

Figure 3A:
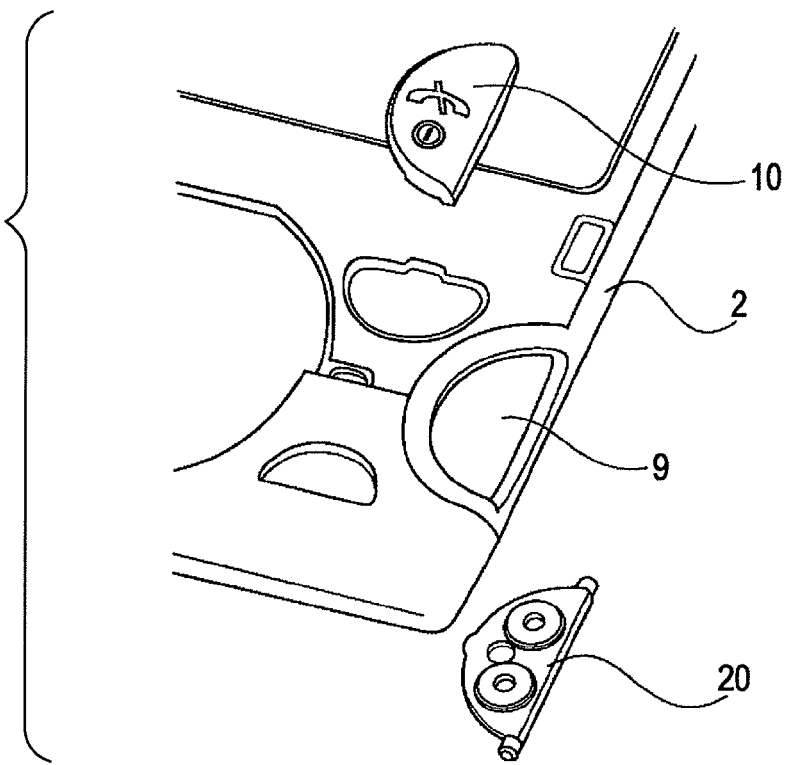
FIGS. 3A and 3B are exploded perspective views illustrating the exemplary structure of the operation unit of the embodiment.
Figure 3B:
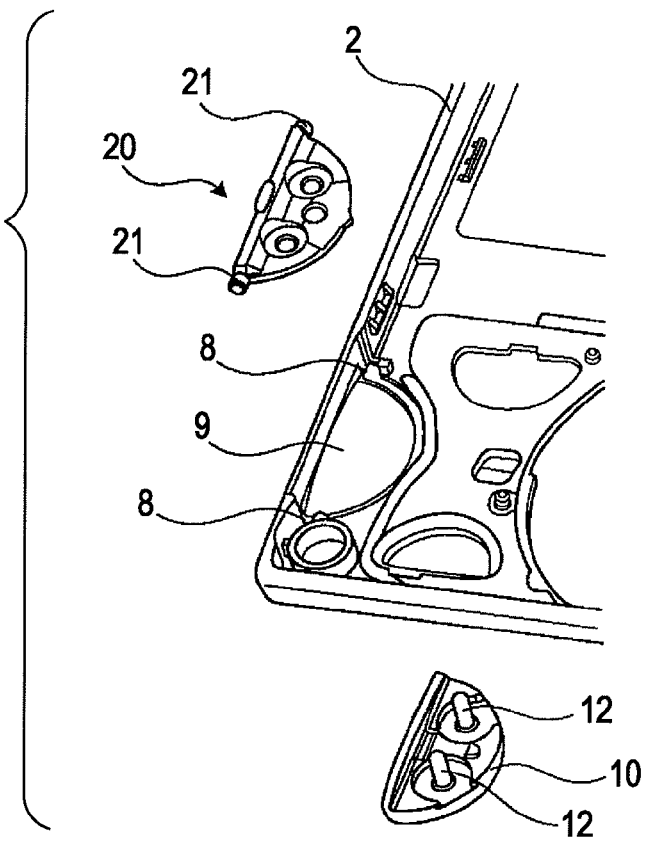

FIGS. 3A and 3B are exploded perspective views illustrating the exemplary structure of the operation unit 5.

FIG. 3A is an exploded perspective view illustrating the exemplary structure of the operation unit 5 when the part of the first housing 2 is viewed from the front side.

A through cut portion 9 is provided at the corner defined by a wide surface and a side surface of the first housing 2 so that the key 10 can be mounted therein. As described above, the key 10 and the key support portion 20 attached to the key 10 are mounted in the cut portion 9.

FIG. 3B is an exploded perspective view illustrating the exemplary structure of the operation unit 5 when the part of the first housing 2 is viewed from the back side.

Two connecting portions 12 are provided on the back side of the key 10, and are inserted in the through holes 22 provided in the key support portion 20.

Figure 4A:
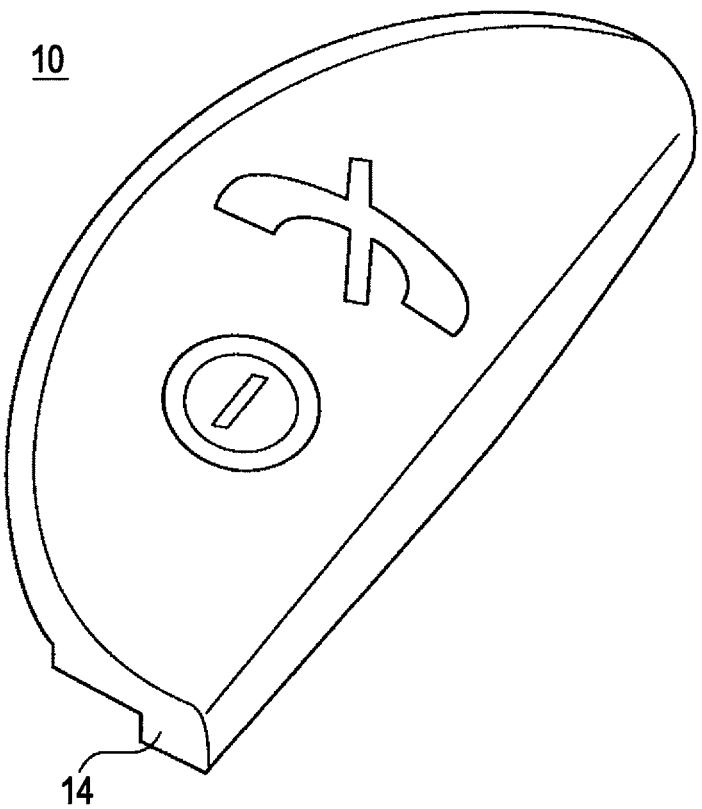
FIGS. 4A and 4B are perspective views illustrating an exemplary structure of a key of the embodiment.
Figure 4B:
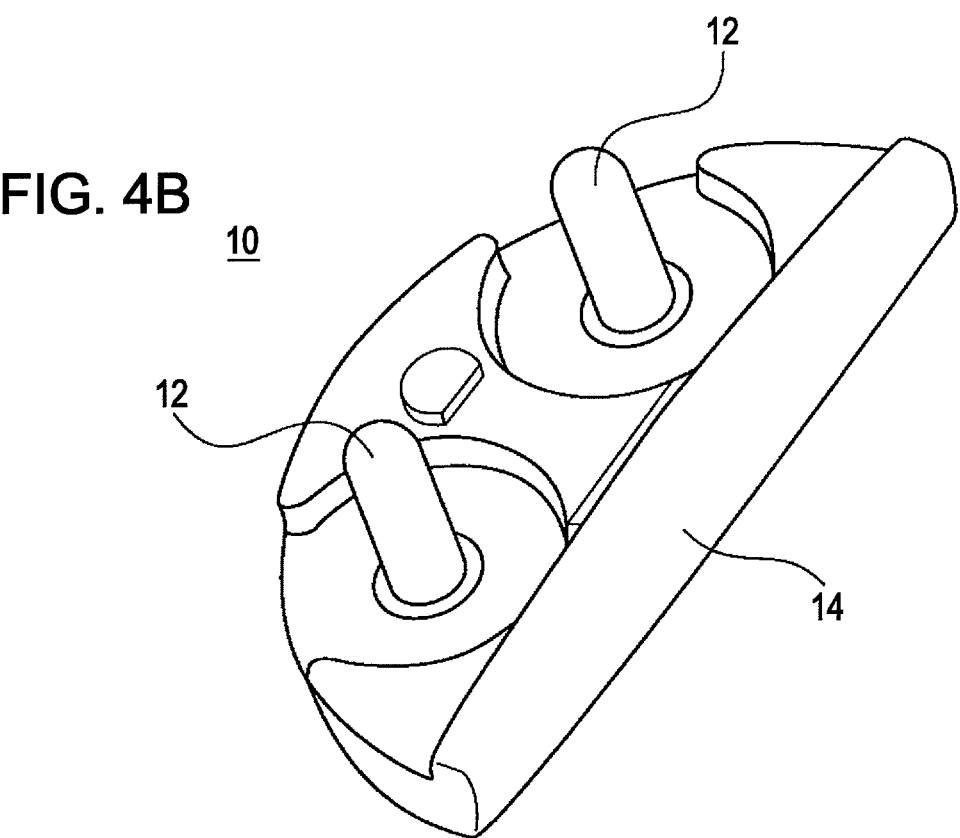

FIGS. 4A and 4B are perspective views illustrating an exemplary structure of the key 10.

FIG. 4A is a perspective view illustrating the exemplary structure of the key 10, as viewed from the front side.

A side face of the key 10 is provided with a wall portion 14 shaped in conformity to the shape of the side surface of the first housing 2. The wall portion 14 serves to protect the shaft portions 21 of the key support portion 20 from external impact and to prevent foreign substances from entering the first housing 2.

FIG. 4B is a perspective view illustrating the exemplary structure of the key 10, as viewed from the back side.

The connecting portions 12 are provided on the back side of the key 10. In the embodiment, the connecting portions 12 are formed by two projections. By welding the connecting portions 12 that are inserted in the through holes 22 of the key support portion 20, the key 10 can be prevented from falling off the key support portion 20 even when some impact is applied thereto. Preferably, a plurality of connecting portions 12 are provided. Further, while the connecting portions 12 are formed by a plurality of projections each shaped like a cylindrical column in the embodiment, they may be each shaped like a polygonal column.

Figure 5A:
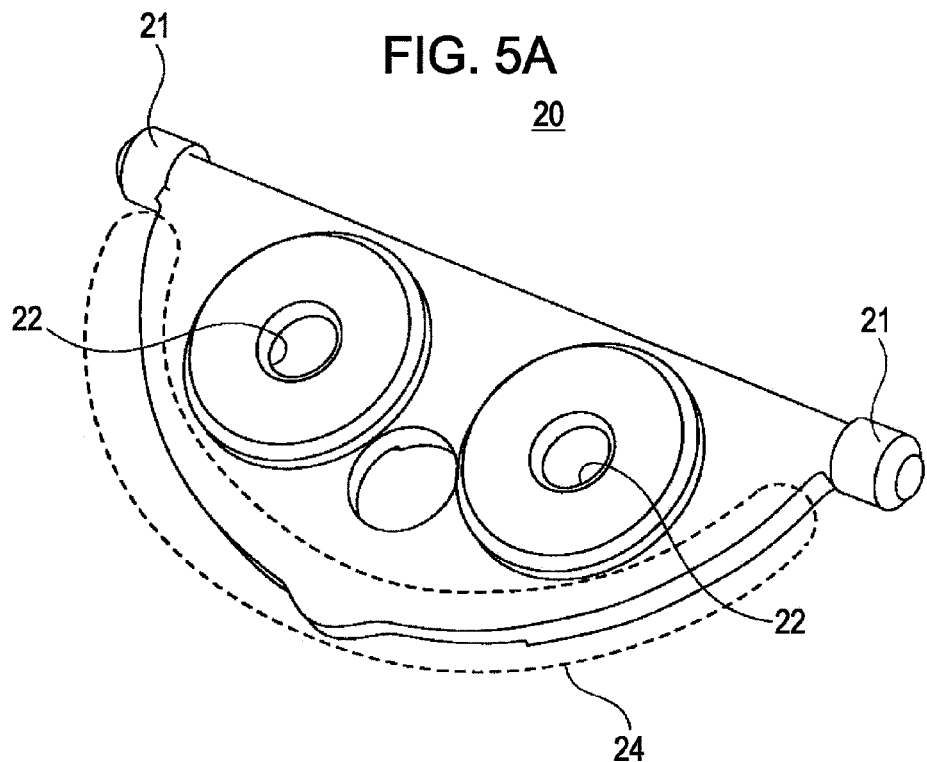
FIGS. 5A and 5B are perspective views illustrating an exemplary structure of a key support portion of the embodiment.
Figure 5B:
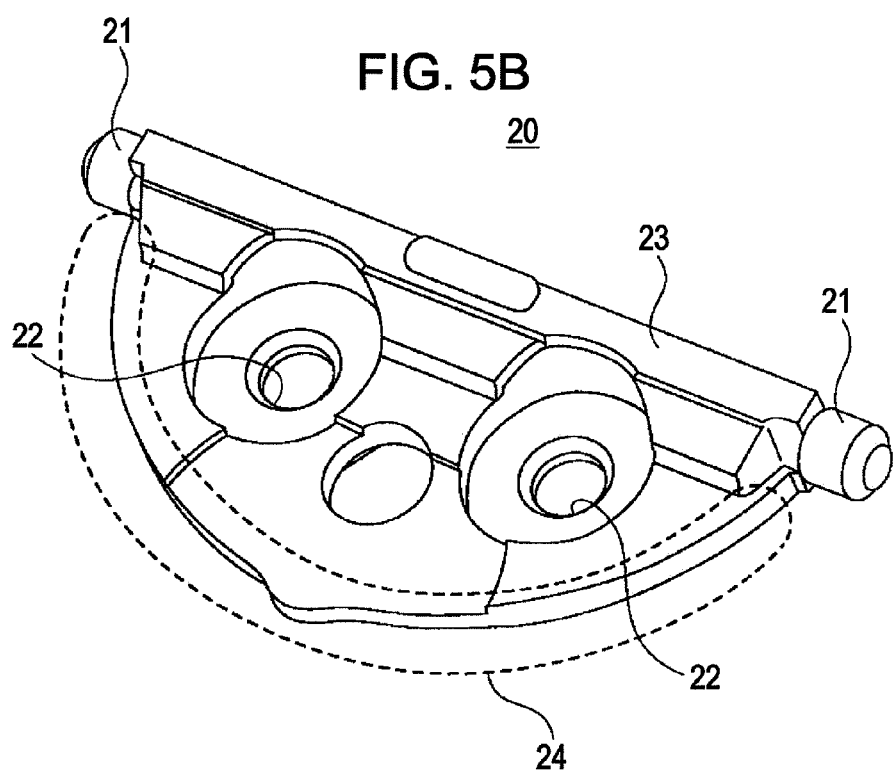

FIGS. 5A and 5B are perspective views illustrating an exemplary structure of the key support portion 20.

FIG. 5A is a perspective view illustrating the exemplary structure of the key support portion 20, as viewed from the front side.

The shaft portions 21 are provided at opposite ends of the key support portion 20, and the key support portion 20 turns up and down on the shaft portions 21 by a predetermined angle. The thickness of the rims of the through holes 22 is increased so that the through holes 22 can withstand stress transmitted via the connecting portions 12 inserted therein.

At a peripheral edge of the key support portion 20, a peripheral edge portion 24 is provided in a manner such as to be caught by a peripheral edge of the cut portion of the first housing 2. Since the peripheral edge portion 24 is slightly larger than the outer shape of the key 10, it can prevent the key 10 and the key support portion 20 from falling off the first housing 2 when the key 10 and the key support portion 20 are attached from the back side of the first housing 2.

FIG. 5B is a perspective view illustrating the exemplary structure of the key support portion 20, as viewed from the back side.

Since the pressing force transmitted from the key 10 is repetitively applied to the shaft portions 21, the rotation axis is entirely protected by a thick shaft reinforcing portion 23. After being fitted in the through holes 22, the connecting portions 12 are welded. To prevent the melted connecting portions 12 from flowing out to other portions in this case, peripheral portions of the through holes 22 are depressed.

Figure 6A:
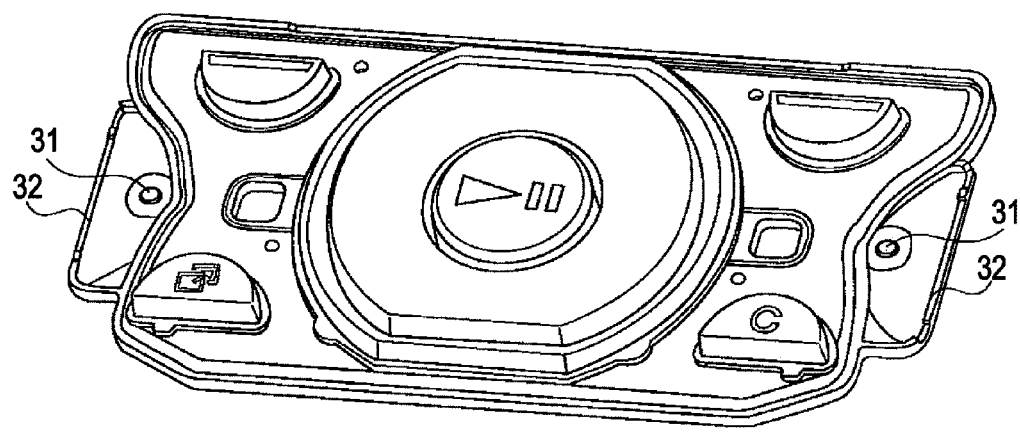
FIGS. 6A and 6B are perspective views illustrating an exemplary structure of a transmitting portion of the embodiment.
Figure 6B:
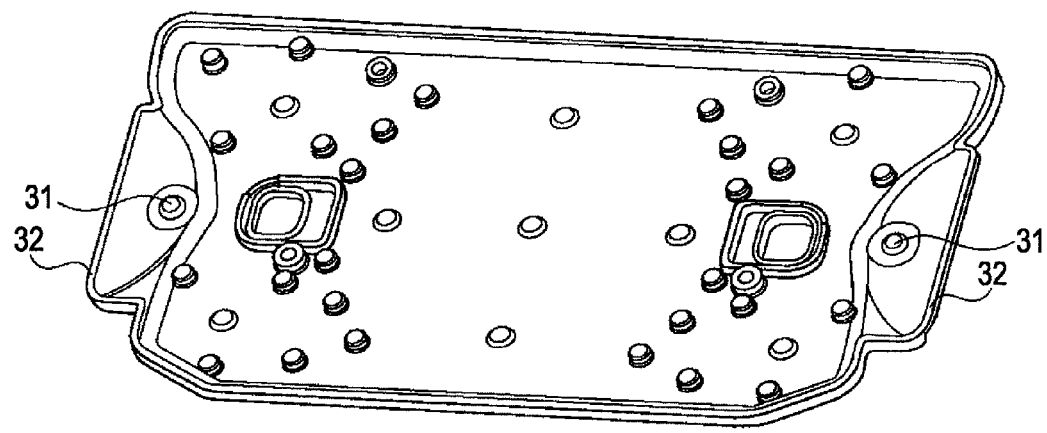

FIGS. 6A and 6B are perspective views illustrating an exemplary structure of the transmitting portion 30.

FIG. 6A is a perspective view illustrating the exemplary structure of the transmitting portion 30, as viewed from the front side.

The transmitting portion 30 is integrally molded from elastic resin, and serves to transmit the pressing force applied to the operation unit 5 to various switches attached to the first housing 2 in correspondence with various keys attached to the first housing 2. For this reason, when a predetermined pressing force is applied to the key 10 in the rotating direction determined by the rotation axis of the shaft portions 21, the transmitting portion 30 transmits the pressing force via the key support portion 20 to a predetermined portion of the substrate 6 (switch 7 in the embodiment).

At a peripheral edge of the transmitting portion 30, a peripheral edge portion 32 is provided to maintain the shape of the transmitting portion 30 and to prevent water from flowing onto the substrate 6 when the transmitting portion 30 is stored between the first housing 2 and the second housing 3. The transmitting portion 30 is formed of elastic resin, covers the substrate 6, and is in contact with the keys 10 or the key support portions 20. Thus, the transmitting portion 30 also protects the substrate 6 and various switches.

FIG. 6B is a perspective view illustrating the exemplary structure of the transmitting portion 30, as viewed from the back side.

Projections 31 are provided corresponding to the pressing areas 11 of the keys 10. Similarly, a plurality of projections are provided in other portions. When the key 10 is pressed, pressing force is transmitted to the switch 7 via the projection 31.

Figure 7:
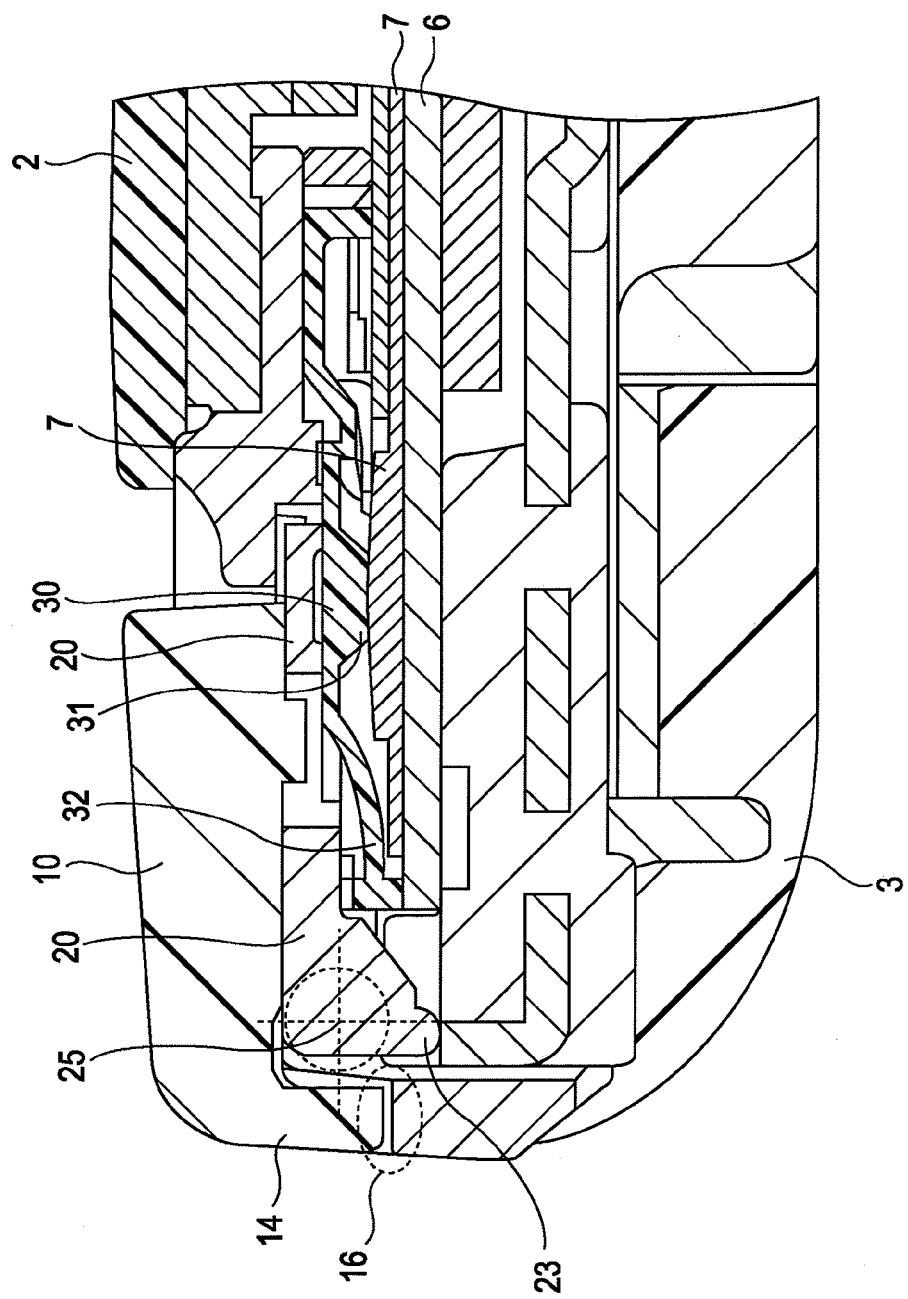
FIG. 7 is a cross-sectional structural view of a part of the portable terminal device of the embodiment, taken along line VII-VII in FIG. 1A.

FIG. 7 is a cross-sectional view of a part of the portable terminal device 1 shown in FIG. 1, taken along line VII-VII in FIG. 1.

Referring to FIG. 7, when the key 10 is pressed, the projection 31 provided in the transmitting portion 30 is moved downward via the key support portion 20, thereby pressing the switch 7. In this case, the key 10 turns inward by a predetermined angle on a center point 25 on the rotation axis defined by the shaft portions 21, and moves by a predetermined moving distance. Since the inner side of the wall portion 14 of the key 10 comes into contact with the shaft reinforcing portion 23 of the key support portion 20, the key 10 will not be pressed excessively.

A slight gap 16 is provided between the key 10 and the second housing 3. This gap 16 prevents an unnecessary resistance from being caused by the contact between the key 10 and the second housing 3 even when the key 10 is pressed. Further, since the gap 16 is sufficiently small, it can prevent the nail of the user, dust, etc. from entering between the first housing 2 and the second housing 3. The peripheral edge portion 32 of the transmitting portion 30 covers the substrate 6, and is in tight contact with the back side of the key 10, the back surface of the key support portion 20, and the front surface of the substrate 6. This prevents water from flowing onto the substrate 6.

Figure 8:
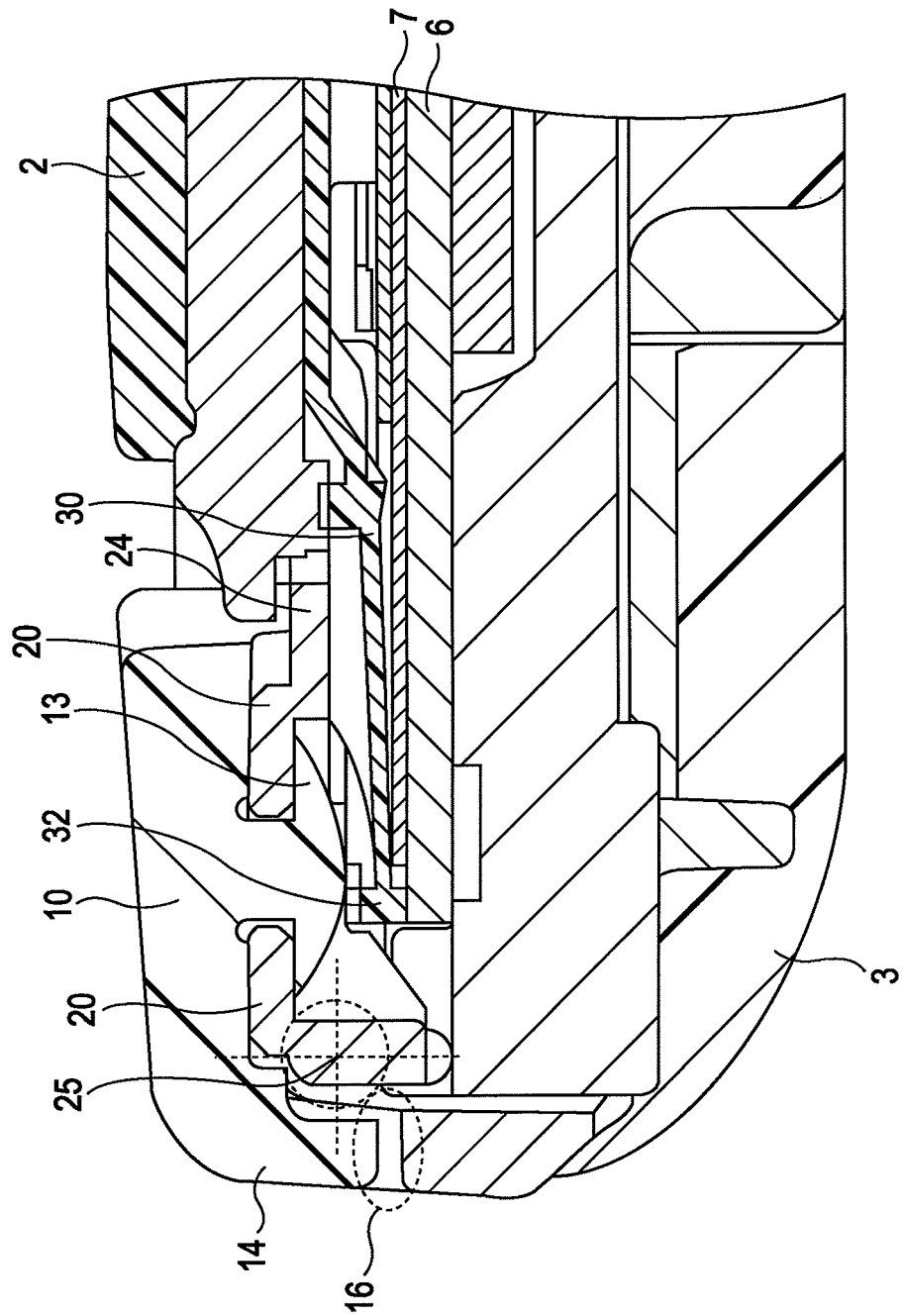
FIG. 8 is a cross-sectional structural view of the part of the portable terminal device of the embodiment, taken along line VIII-VIII in FIG. 1A.

FIG. 8 is a cross-sectional view of the part of the portable terminal device 1 shown in FIG. 1, taken along line VIII-VII in FIG. 1.

FIG. 8 shows that the key 10 is connected to the key support portion 20 by the welded portion 13 formed by welding the connecting portion 12 of the key 10. Further, the peripheral edge portion 24 of the key support portion 20 is caught by the cut portion of the first housing 2. For this reason, even if forces are applied to the key 10 from various directions, the key 10 will not easily fall off the first housing 2.

Figure 9:
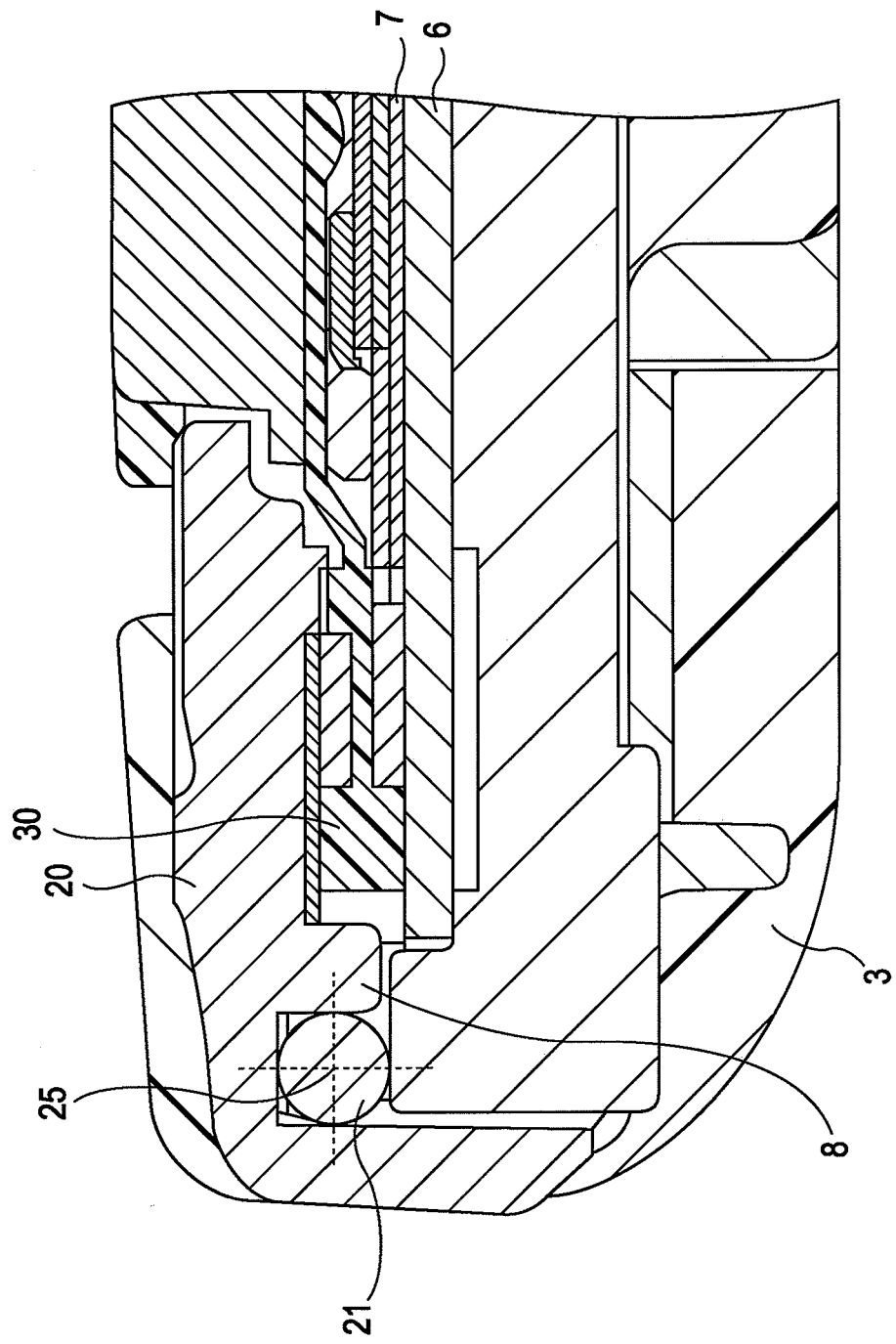
FIG. 9 is a cross-sectional structural view of the part of the portable terminal device of the embodiment, taken along line IX-IX in FIG. 1A.

FIG. 9 is a cross-sectional view of the part of the portable terminal device 1 shown in FIG. 1, taken along line IX-IX in FIG. 1.

FIG. 9 shows that the shaft portions 21 are rotatably attached to the bearing portions 8 provided in the first housing 2. For this reason, the shaft portions 21 are fixed at predetermined positions, and can rotate the pressed key 10 in the predetermined rotating direction.

According to the above-described portable terminal device 1 of the embodiment, the key 10 is attached to the cut portion 9 of the first housing 2 after being connected to the key support portion 20 by the connecting portions 12. Further, the key support portion 20 has the shaft portions 21, and the first housing 2 has the bearing portions 8. The center shafts of the shaft portions 21 are fixed to the bearing portions 8. Since the shaft portions 21 turn on the rotation axis on a side of the side face of the corner of the key 10, the direction in which the key 10 rotates when the pressing force is applied thereto is determined, the gap 16 is reduced, and the key 10 can be attached to the cut portion at the corner of the first housing 2 while ensuring a predetermined moving distance of the key 10. For this reason, even if the space of the first housing 2 where the key 10 is attached is small, the key 10 can be placed at the corner of the portable terminal device 1. This improves the design of the portable terminal device 1.

The connecting portions 12 are formed by a plurality of projections, and are inserted in the through holes 22 of the key support portion 20 and welded, so that the key 10 and the connecting portions 12 are connected firmly. For this reason, the key 10 and the connecting portions 12 will not be easily disconnected. As a result, the impact resistance of the key 10 is increased, and the key 10 will not fall off the first housing 2.

When the key 10 is pressed by the user, it presses the switch 7 provided on the substrate 6 via the key support portion 20 and the transmitting portion 30. For this reason, damage to the switch 7 is avoided and durability increases, compared with the case in which the key 10 directly presses the switch 7.

The transmitting portion 30 is formed of elastic resin, covers the substrate 6, and is in contact with the keys 10 or the key support portions 20. For this reason, the transmitting portion 30 can prevent entry of water onto the substrate 6, and increase the resistance to failure.

2. Modifications

According to the above-described portable terminal device 1 of the embodiment, the keys 10 are provided at the corners of both side faces of the first housing 2. However, the positions of the keys 10 are not limited thereto, and the keys 10 may be provided at various positions. Further, the number of keys 10 placed at the corners of both side faces may be one, or three or more. Still further, the shape of the keys 10 is not limited to the semicircular shape, and the keys 10 may have other shapes.

The number of projections formed as the welded portions 13 may be one, or three or more. Further, the welded portions 13 may be formed not only by heat welding, but also by ultrasonic welding. Alternatively, adhesive or double-sided adhesive tapes may be used as the connecting portions 12 for connecting the key 10 and the key support portion 20.

The present application contains subject matter related to that disclosed in Japanese Priority Patent Application JP 2009-129604 filed in the Japan Patent Office on May 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device comprising:
   a first housing;
   a key attached to a cut portion provided in a corner of the first housing;
   a key support portion configured to support the key, the key support portion including (a) a shaft portion having a rotation axis on a side of a side face of the corner and the shaft portion attached to a bearing portion provided in the first housing, and (b) a peripheral edge portion being caught by a peripheral edge of the cut portion of the first housing, wherein the key support portion is attached from a back side of the first housing via the shaft portion and the peripheral edge portion;
   a switch provided on a substrate;
   a transmitting portion configured to transmit a predetermined pressing force to the switch via the key support portion when the predetermined pressing force is applied to the key in a rotation direction determined by the rotation axis; and
   a second housing combined with the first housing to which the key and the key support portion are attached so as to store the transmitting portion, the substrate, and the switch.

2. The terminal device according to claim 1,
   wherein the key and the key support portion are connected by a connecting portion,
   wherein the connecting portion includes a plurality of projections provided on the key,
   wherein the key support portion has through holes in which the projections are inserted, and
   wherein the key is supported by the key support portion by welding the projections inserted in the through holes.

3. The terminal device according to claim 1, wherein the transmitting portion is formed of elastic resin, covers the substrate and the switch, and is in contact with the key or the key support portion.

4. The terminal device according to claim 2, wherein the transmitting portion is formed of elastic resin, covers the substrate and the switch, and is in contact with the key or the key support portion.

* * * * *